US007627648B1

(12) United States Patent
Mehta et al.

(10) Patent No.: US 7,627,648 B1
(45) Date of Patent: Dec. 1, 2009

(54) CUSTOMIZING AND STORING WEB PAGES FOR MOBILE ON WEB

(75) Inventors: Satish Mehta, Fremont, CA (US); Srinivas Margasahayam, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 12/508,443

(22) Filed: Jul. 23, 2009

(51) Int. Cl.
*G06F 15/16* (2006.01)

(52) U.S. Cl. .................. 709/217; 709/218; 709/219; 709/220; 709/227

(58) Field of Classification Search .............. 709/217, 709/218, 219, 220, 227
See application file for complete search history.

(56) References Cited

U.S. PATENT DOCUMENTS

| | | | |
|---|---|---|---|
| 5,983,247 A | | 11/1999 | Yamanaka et al. |
| 6,088,730 A | * | 7/2000 | Kato et al. .................. 709/227 |
| 6,134,584 A | * | 10/2000 | Chang et al. ................ 709/219 |
| 6,278,449 B1 | | 8/2001 | Sugiarto et al. |
| 6,336,142 B1 | * | 1/2002 | Kato et al. .................. 709/227 |
| 6,766,362 B1 | | 7/2004 | Miyasaka et al. |
| 6,806,887 B2 | | 10/2004 | Chernock et al. |
| 6,823,370 B1 | * | 11/2004 | Kredo et al. ................. 709/206 |
| 6,925,595 B1 | | 8/2005 | Whitledge et al. |
| 7,023,572 B2 | | 4/2006 | Tuli et al. |
| 7,191,211 B2 | * | 3/2007 | Tuli ........................... 709/203 |
| 7,228,340 B2 | | 6/2007 | De Boor et al. |
| 7,263,547 B2 | | 8/2007 | Kloba et al. |
| 7,509,374 B2 | | 3/2009 | Trinh et al. |
| 2002/0116534 A1 | | 8/2002 | Teeple |
| 2005/0097190 A1 | | 5/2005 | Abdelhak |
| 2005/0193053 A1 | | 9/2005 | Kendall et al. |
| 2008/0313722 A1 | * | 12/2008 | Cho et al. ...................... 726/7 |
| 2009/0089293 A1 | * | 4/2009 | Garritano et al. ............ 707/10 |
| 2009/0089448 A1 | * | 4/2009 | Sze et al. .................... 709/231 |

OTHER PUBLICATIONS

Schilit et al., "Web Interaction Using Very Small Internet Devices", Oct. 2002, pp. 37-45, IEEE Computer Society, vol. 35, Issue 10.
Laakko et al., "Adapting Web Content to Mobile User Agents", Mar.-Apr. 2005, pp. 46-53, vol. 9, Issue 2, IEEE Internet Computing.
Buyukkokten et al, "Efficient Web Browsing for PDAs", Proceeding of Conference on Human Factors in Computing Systems, 2000, pp. 430-437, ACM Press, New York.

* cited by examiner

*Primary Examiner*—Liangche A Wang
(74) *Attorney, Agent, or Firm*—Darby & Darby P.C.; Scott M. Tobias

(57) ABSTRACT

A device, system and method to enable a user to create a customized or tailored image of a web page that is specific to, and can be displayed on, a mobile, web-enabled device. The tailored image of the web page may include enlargeable images of subsections of the web page that are accessed by the user clicking on or scrolling over the subsection of the tailored image. The tailored image may also include hotspots corresponding to selectable elements of the web page.

12 Claims, 9 Drawing Sheets

CUSTOMIZING AND STORING WEB PAGES FOR MOBILE ON WEB

TECHNICAL FIELD

The invention relates generally to customizing existing web pages for subsequent display on a particular mobile device. More particularly, the invention enables a user to select at least a portion of an existing web page that is the basis for a selectable image that is customized for the capabilities of a particular mobile device.

BACKGROUND

A large amount of information and entertainment is available on websites that are accessible over networks such as the Internet. And in most instances, this information is located on web pages that are viewable and interoperable in a manner suitable for relatively stationary computing devices with large displays, such as desktop and notebook computers. Typically, the displays of these computing devices enable an entire web page to be viewed without scrolling. Also, web pages often include selectable links that enable navigation to other web pages and/or resources which can provide different types of functionality, such as audio, image, and video. Additionally, the navigation of some web pages is designed for relatively standard user interfaces, such as a keyboard and a pointing device.

As a result of several advances in wireless technology, relatively small mobile devices have become ubiquitous, such as telephones, smart phones, pagers, Personal Digital Assistants (PDAs), tablet computers, network appliances, wireless headsets, digital cameras, and integrated devices combining the functionality of one or more of these devices, or the like. And many of these "pocket sized" mobile devices are capable of wirelessly communicating information over large remote networks, such as the Internet.

Unfortunately, each type of mobile device often has one or more constraints that limit their ability to present web pages in the same manner as other larger computing devices, such as personal computers and notebook computers. For example, the resolution, size, and color palette of a display screen integrated into a mobile device is often unique to that particular type of mobile device and much smaller than that which is available for the larger computing devices. Also, there are several different types of user interfaces for navigation provided for the different types of mobile devices, e.g., touch screens, scroll wheels, thumb keyboards, function keys, or the like. Additionally, a browser application employed to present a web page for display with a mobile device is often uniquely configured to operate in a manner optimized for that particular mobile device's display screen, navigation controls, and functionality. Consequently, the manner of in which web pages are displayed for particular mobile devices is often somewhat different than web pages that are displayed for larger computing devices that have somewhat relatively standard navigation controls and functionality, and significantly larger display screens with greater resolutions, sizes and color palettes.

Although some websites are now providing web pages that are separately optimized for display with a mobile device, most do not. And even those web sites that do provide such "optimized" mobile web pages, their content is often incomplete and incompatible with the different types and constraints of many mobile devices.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
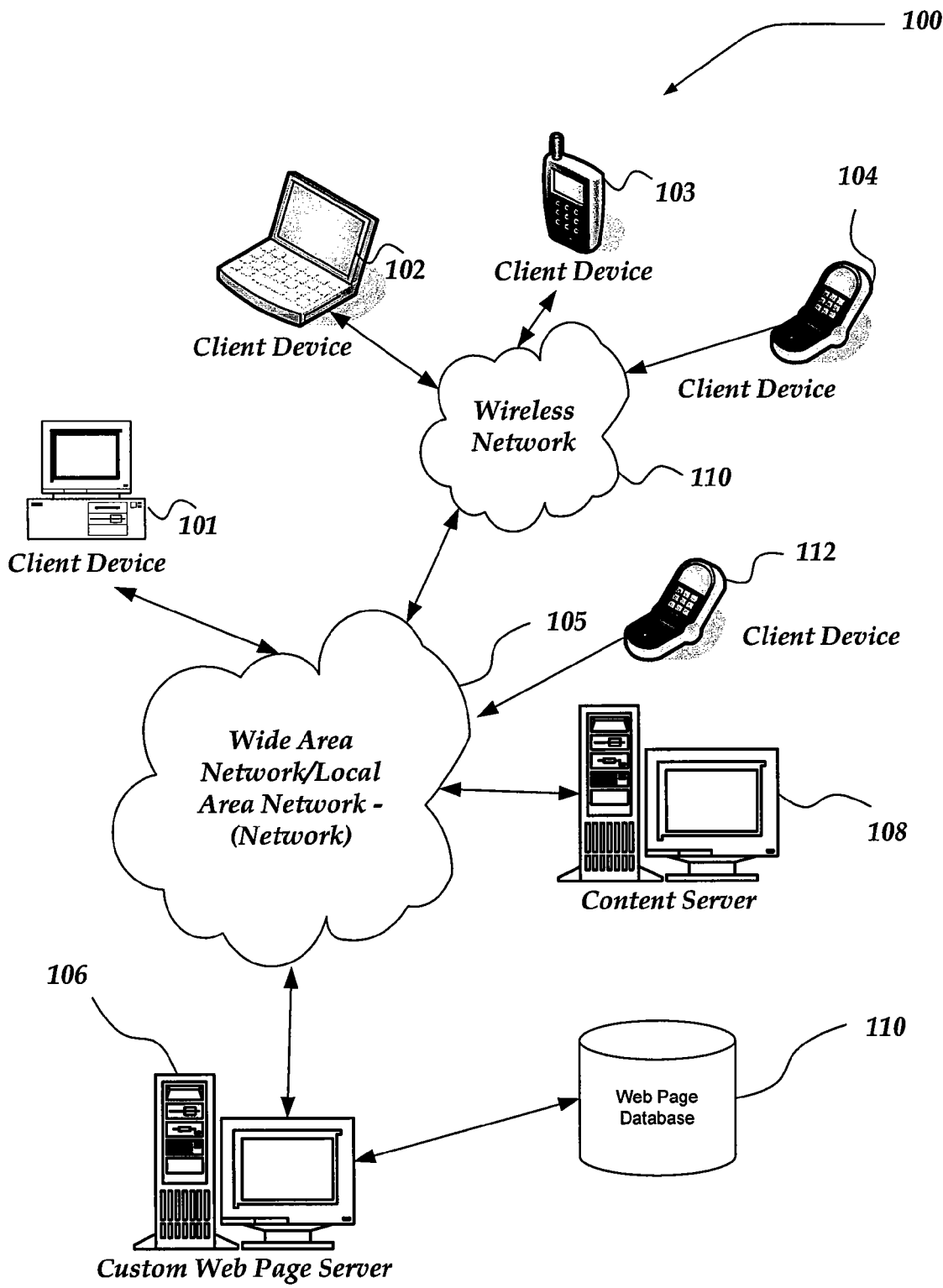
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments of the invention. However, this invention may be embodied in many different forms and should not be construed as limited to the embodiments set forth herein. Rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. Therefore, the following detailed description is not to be taken in a limiting sense.

Throughout the specification and claims, the following terms take the meanings explicitly associated herein, unless the context clearly dictates otherwise. The phrase "in one embodiment" does not necessarily refer to the same embodiment, although it may. Furthermore, the phrase "in another embodiment" does not necessarily refer to a different embodiment, although it may. Thus, as described below, various embodiments of the invention may be readily combined without departing from the scope or spirit of the invention.

The following briefly describes the embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

In one embodiment, a user may set up a customization for one or more web pages from an identified website for display by a specific mobile device. Initially, the user characterizes the specific mobile device to which the user seeks to create customized web pages. For example, the user might identify the manufacturer and model number of a mobile device, wireless service provider, mobile identification number ("MIN"), or the like. Also, in one or more embodiments, an application could be provided that remotely characterizes a specific mobile device based on directly accessing the capabilities and functionality of that mobile device and/or referencing previously determined information regarding that type of specific mobile device. Additionally, the user can identify the particular website by providing and/or selecting some kind of identifier, e.g., vocalized web site identifier, keyword(s), image(s), graphic, icon, a User Resource Locator ("URL"), Uniform Resource Identifier ("URI"), IP address, or the like, that is associated with a particular website.

Also, in at least one embodiment, the customization setup may be performed remote to the mobile device with a computing device with a relatively larger display and relatively standard navigation devices, such as a keyboard and a pointing device. However, the customization setup may also be performed with another mobile device or with the specific mobile device that the user characterizes.

During the set up customization, web pages from the identified web site are displayed for the user. At least a subsection of a web page from the identified web site is selectable by the user. And each web page and/or subsection that is selected by the user is reformatted for display and operability on the specifically characterized mobile device. The reformatted web pages and/or subsections are displayed to the user for approval. In at least one embodiment, once the reformatting is approved by the user, an interoperable reformatted version of the selected web pages and/or subsections are stored. The stored reformatted web page can also include clickable or selectable elements for retrieving reformatted versions of user selected subsections. Also, reformatted versions of the selected subsections can be stored. An identifier for the location of the stored reformatted versions of the web page and/or subsections is formatted for display by the characterized mobile device and stored. Later, if a user selects this stored identifier, the stored reformatted versions of the web page and/or subsections are presented for display by the specifically characterized mobile device.

In at least one other embodiment, an identifier for the location of the selected web page and/or subsections is formatted for display by the characterized mobile device and stored. Later, if a user selects this stored identifier, reformatted versions of the selected web pages and/or subsections are dynamically generated for display by the specifically characterized mobile device. The dynamically generated reformatted current versions of the web pages can also include clickable elements for retrieving the dynamically generated reformatted current versions of user selected subsections. This embodiment enables the user to view website pages and subsections that contain dynamically varying information, such as stock quotes and the weather.

In one embodiment, both the selectable version and the interoperable (clickable) version of a selected website page and/or subsection is displayed in an image format, such as JPEG, GIF, BMP, MPEG, or the like. And if a subsection of the image is selected, a complete view or "zoom in" of just the subsection is reformatted for display by the user's specifically characterized mobile device.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 105, wireless network 110, client devices 101-104, custom web page server 106, and content server 108.

Generally, client devices 102-104 may include virtually any mobile computing device capable of communicating over a network, such as wireless network 110, or the like. Such mobile devices are portable and relatively small in size such as, cellular telephones, smart phones, pagers, radio frequency (RF) devices, infrared (IR) devices, Personal Digital Assistants (PDAs), handheld computers, laptop computers, wearable computers, tablet computers, network appliances, digital cameras, integrated devices combining one or more of the preceding devices, or the like. One embodiment of a mobile device usable as one of client devices 102-104 is described in more detail below in conjunction with FIG. 2. In one embodiment of the system, the mobile device intended to receive the customized web pages are client devices 103 and 104. The mobile device may also include laptop computers, wearable computers, tablet computers and the like to the extent that the displays of such devices may have limited capabilities of displaying web pages that are not specifically written for mobile web usage.

Client device 101 may include virtually any computing device that typically connects using a wired communications medium such as personal computers, multiprocessor systems, microprocessor-based or programmable consumer electronics, network appliances, notebook computers, or the like. In one embodiment, client devices 101-104 may be configured to operate over a wired and/or a wireless network.

Client devices 101-104 typically range widely in terms of capabilities and features. For example, a cell phone may have a numeric keypad and a few lines of monochrome LCD display on which text may be displayed. In another example, a client device may have a touch sensitive screen, a stylus, scroll wheel, and a display with several lines of color resolution in which both text and images may be displayed.

A client device may include a browser application that is configured to receive and to send web pages, messages, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send communications.

Client devices 101-104 also may include at least one other client application that is configured to receive content from another computing device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), network address, or other device identifier. The information may also indicate a content format that the client device is enabled to employ. Such information may be provided in a communication, or the like, sent to another computing device.

Client devices 101-104 may also be configured to communicate through email, Short Message Service (SMS), Multimedia Message Service (MMS), instant messaging (IM), internet relay chat (IRC), Mardam-Bey's IRC (mIRC), Jabber, or the like, with and between another computing device. However, the present invention is not limited to these communication protocols, and virtually any other communication protocol may be employed. Client devices, such as client device 112, may be configured to implement transmission of voice through the internet or other packet-switched networks through Voice-over-Internet protocol (VoIP).

Client devices 101-104 may further be configured to include a client application that enables the user to log into a user account that may be managed by another computing device, such as content server 108, custom web page server 106, or the like. Such user account, for example, may be configured to enable the user to receive emails, send/receive IM messages, SMS messages, access selected web pages, participate in a social networking activity, provide messages that may include links or attachments, or the like. However, managing of communications may also be performed without logging into the user account.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, or the like. Access technologies such as 2G, 3G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple custom web page server 106 and its components with other computing devices, including, content server 108, client device 101, and through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, or the like, in the signal. By way of example, communication media includes wired media such as twisted pair, coaxial cable, fiber optics, wave guides, and other wired media and wireless media such as acoustic, RF, infrared, and other wireless media.

One embodiment of custom web page server 106 is described in more detail below in conjunction with FIG. 3. Briefly, however, custom web page server 106 may include any computing device capable of connecting to network 105 to enable communications to and from a user. In one embodiment, custom web page server 106 provides an interface for the creation of custom web pages for mobile devices. In another embodiment of the system, custom web page server 106 provides the interface for both the creation of custom web pages for mobile and for providing the custom web pages to the mobile devices.

In one embodiment of the system, custom web page server 106 may host the customized mobile web page. Custom web page server 106 may store either the custom mobile web page, information permitting creation of the custom mobile web page or information providing direction to a secondary resource that may have either the custom mobile web page or information that permits the creation of the custom mobile web page. This information may be accessed by a user through an URL or URI in which custom web page server 106 may be the domain and the custom mobile web page (or other information identifying the custom mobile web page) is identified by a path, filename and/or fragment in the hierarchical part. In another embodiment of the system, the customized mobile web page may be accessed through SMS for the initial URL.

In another embodiment of the system, custom web page server 106 may be a proxy server that customizes the requested web page on demand by using previously identified information of the user's mobile, web-enabled device. In yet another embodiment of the system, the web-page may be customized, but without tailoring the requested web page to the specific user's mobile, web-enabled device.

It should be noted that while FIG. 1 illustrates a use of custom web page server 106, the invention is not so limited. For example, as noted above, client devices 101-104 may also be configured with a client application, script, plug-in, widget, applet, or the like, that is configured and arranged to enable the client device to provide custom mobile web pages. Moreover, in another embodiment, various functions performed by custom web page server 106 may be distributed across a plurality of network devices or client devices.

Devices that may operate as custom web page server 106 may include personal computers, desktop computers, multi-processor systems, microprocessor-based or programmable consumer electronics, network PCs, servers, or the like.

Content server 108 includes virtually any network computing device that is configured to provide various resources, including content and/or services over network 105. As such, content server 108 represents one embodiment of a content system. Content server 108 may provide access to any of a variety of content, including, but not limited to messages, such as emails, SMS messages, IM messages; search results; news; articles; websites; hyperlinks; ads; reviews; as well as content that may include audio files, video files, text files, streaming files, graphical files, or the like. Thus, virtually any content may be available through content server 108 for access by client devices 101-104. In one embodiment, content server 108 might be configured and arranged to provide a website for users to post, view, link to, and/or otherwise access, content. Content server 108 might also provide FTP services, APIs, web services, database services, or the like, to enable users to access content. In addition, content server 108 may also provide a messaging service, such as an email server, text messaging server, or the like. However, content server 108 is not limited to these mechanisms, and/or content, and others are envisaged as well.

Content server 108 may include an interface that may request information from a user of client devices 101-104. For example, content server 108 may provide access to an account, which may request user log-in information. Such log-in information may include a user name, password, or other identifier of the user and/or client device used by the user.

Devices that may operate as content server 108 include, but are not limited to personal computers, desktop computers, multiprocessor systems, microprocessor-based or programmable consumer electronics, network PCs, servers, network appliances, notebook computers, mobile devices, and the like. Moreover, while custom web page server 106 and content server 108 are illustrated as distinct devices, the invention is not so limited. For example, in one embodiment, custom web page server 106 and content server 108 may be implemented within a single networked device, or distributed across a plurality of networked devices.

Illustrative Client Environment

Figure 2:
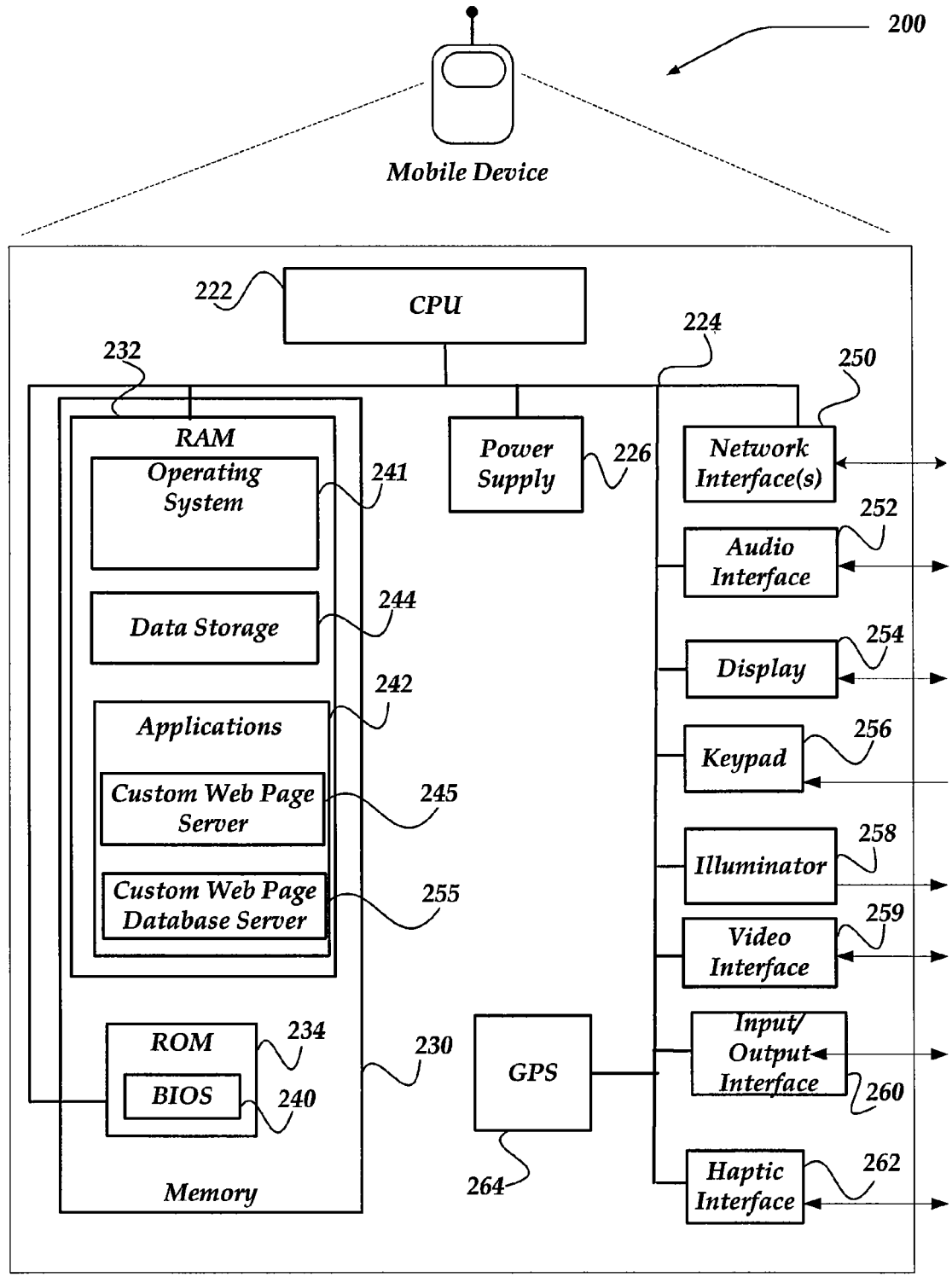
FIG. 2 shows one embodiment of a mobile device that may be included in a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, one of client devices 102-104 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances.

Mass memory 230 includes a RAM 232, a ROM 234, and other storage means. Mass memory 230 illustrates another example of computer readable storage media for storage of information such as computer readable instructions, data structures, program modules, or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, the Symbian® operating system, or Apple iPhone™ Operating System. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. Memory 230 can also be used to store the database information, such as custom mobile web page information. For example, data storage 244 may also be employed to store information that describes various capabilities of mobile device 200. The information may then be provided to another device, for example custom web page server 106, based on any of a variety of events, including being sent as part of a header during a communication, sent upon request, or the like. Moreover, data storage 244 may also be employed to store personal information including but not limited to hyperlinks or the like to websites or to custom mobile web pages. Data storage 244 may also include some profile information. At least a portion of the information may also be stored on a disk drive or other storage medium (not shown) within mobile device 200.

Applications 242 may include computer executable instructions which, when executed by mobile device 200, transmit, receive, and/or otherwise process messages (e.g., SMS, MMS, IM, email, and/or other messages), multimedia information, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth. Applications 242 may also include Custom Web page Manager (CWM) 245 and Custom Web page Database Server 255. Custom Web page Database Server 255 may be any application program for managing a database of a user, as described further below. In one embodiment, Custom Web page Manager 245 may be a browser application. In another embodiment, Custom Web page Manager 245 may be a browser application with a downloadable plug-in, script, applet, widget, or the like, that is configured and arranged to manage displaying of communications to and from the user, and more specifically custom mobile web pages.

CWM 245 may include a browser application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like. However, any of a variety of other web based languages may be employed.

CWM 245 may further be configured as a messenger application that is configured to send, to receive, and/or to otherwise process messages using SMS, MMS, IM, email, VOIP, and/or any of a variety of other messaging communication protocols. Although a single CWM 245 is illustrated it should be clear that multiple applications may be employed. For example, one CWM 245 may be configured to manage SMS messages, where another application may manage IM messages, and yet another messaging client is configured to manage emails, or the like. In one embodiment of the system, these various protocols may be used to transmit information associated with the custom mobile web pages.

Illustrative Network Device Environment

Figure 3:
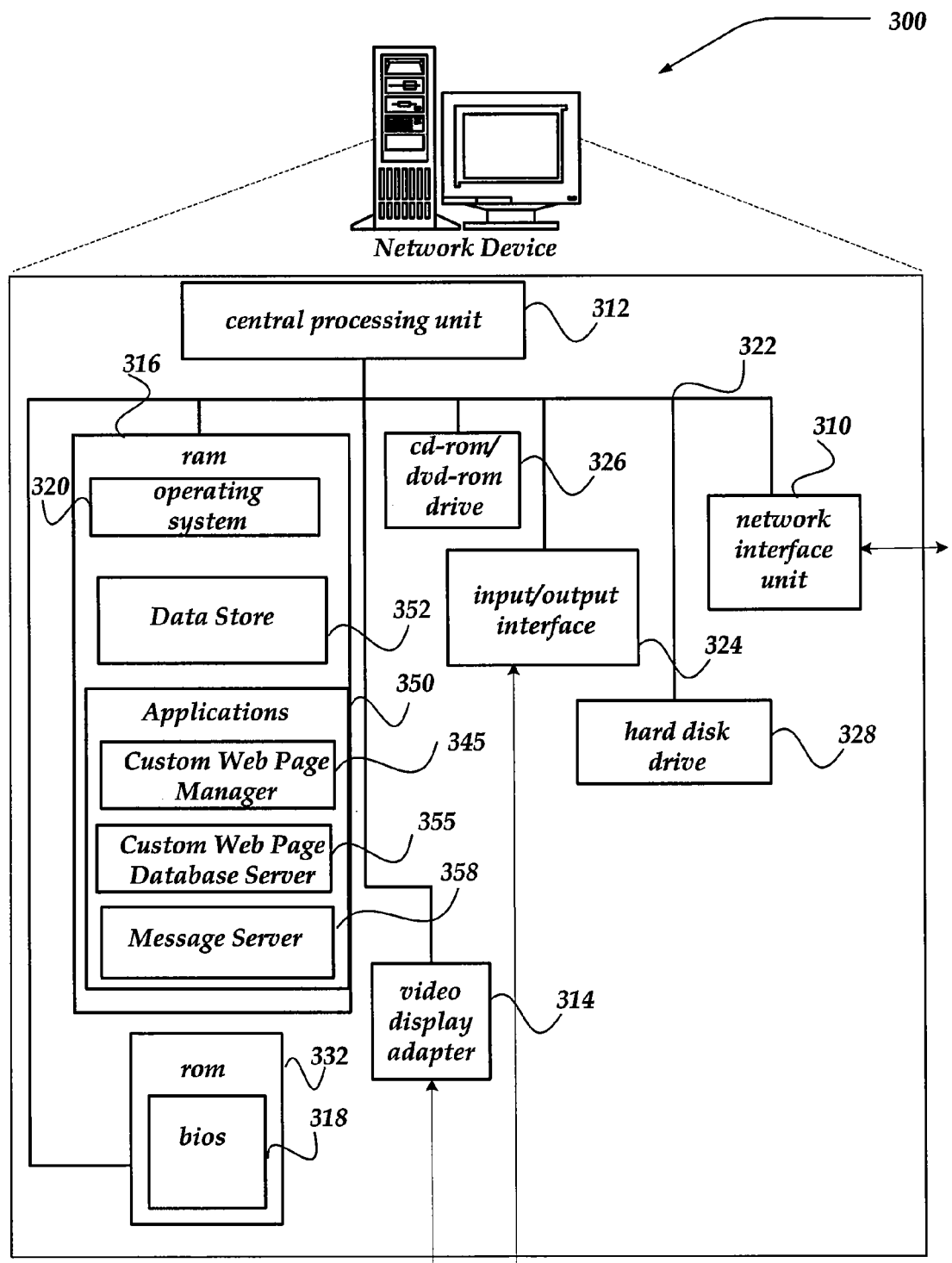
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, custom web page server 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, memory card, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, or network interface card (NIC).

The mass memory as described above can illustrates another type of processor-readable media, namely processor readable storage media. Processor readable storage media may include volatile, nonvolatile, removable, and non-removable media implemented in any method or technology for storage of information, such as processor readable instructions, data structures, program modules, or other data. Examples of processor readable storage media include RAM, ROM, EEPROM, flash memory or other memory technologies, CD-ROM, digital versatile disks (DVD) or other optical storage, magnetic cassettes, magnetic tape, magnetic disk storage or other magnetic storage devices, or any other processor readable medium which can be used to store the desired data and which can be accessed by a computing device.

The mass memory also stores program code. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, web servers, account management, and so forth. Applications 350 may include Custom Web page Database Server (CWDS) 355, Custom Web page Manager 345 and message server 358. These applications can be based in the network device, in the mobile device, or in a distributed network. Thus, the invention may be implemented in a traditional client server arrangement, in a peer to peer network or any other architecture. Alternatively, the invention may be implemented as a software client run on currently existing platforms. A widget or messenger plug-in could implement the applications, wherein the applications are typically defined within the application layer. The mass memory can also alternatively store the user's communication database within data store 352, and/or cd-rom/dvd-rom drive 326, hard disk drive 328, or other computer readable storage medium (not shown).

In one embodiment, CWDS 355 may provide a script, applet, application, or other downloadable component, to a client device for use in managing the access to custom mobile web pages. In another embodiment, CWDS 355 may provide information to message server 358, including an interface, or the like, for use in displaying, and/or otherwise providing access to custom mobile web pages. Although not illustrated, in one embodiment, CWDS 355 may be configured as a plug-in, or the like, to message server 358.

Generalized Operation

The operation of certain aspects of the invention will now be described with respect to FIGS. 4 through 8. Process 400 of FIG. 4 may be implemented, for example, within custom web page server 106 of FIG. 1 or CWDS 355 of FIG. 3.

Figure 4A:
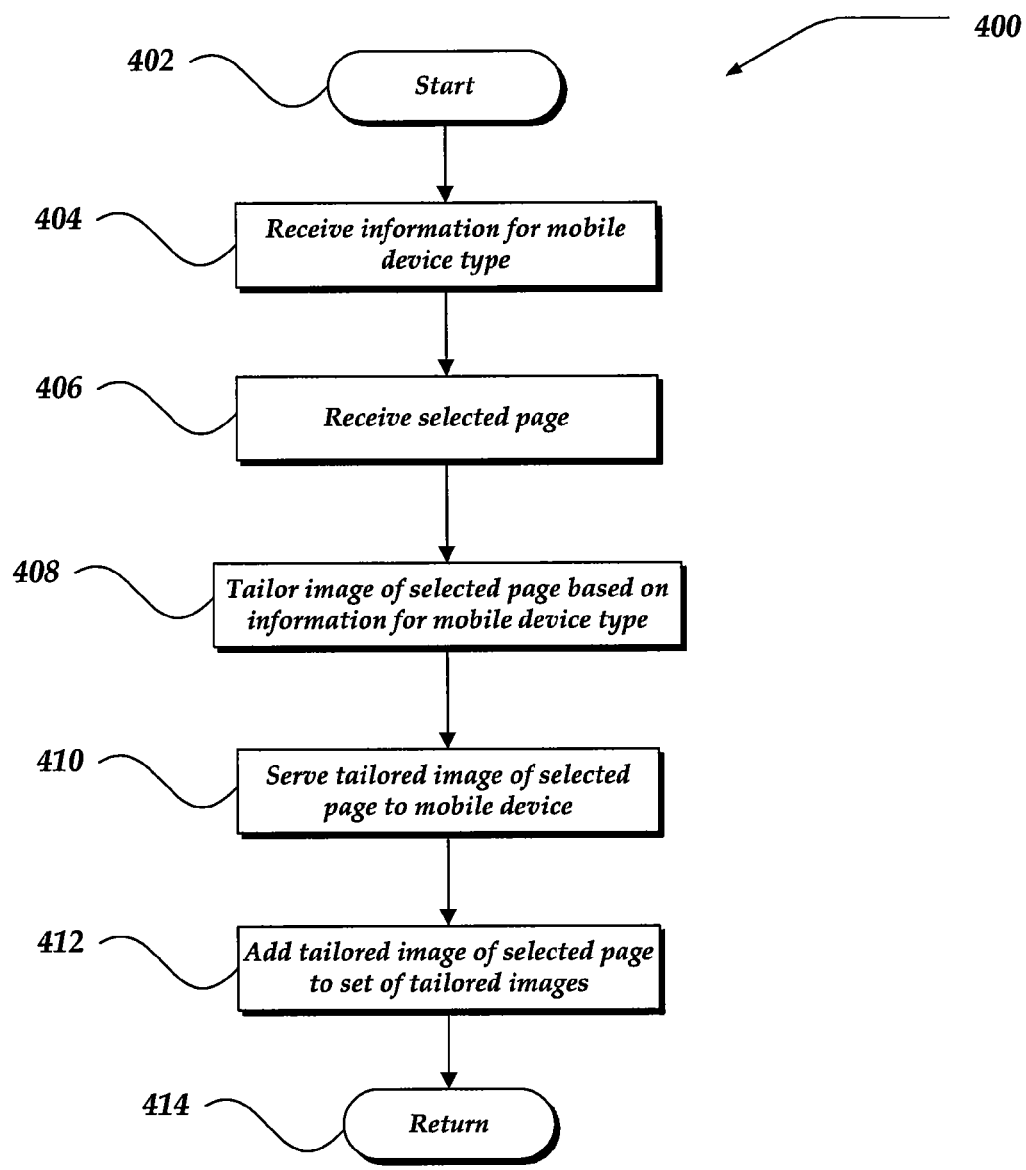
FIG. 4A shows a flow diagram for creation of one embodiment of the system in which a web page may be tailored to a mobile device.

FIG. 4A illustrates a logical flow diagram generally showing one embodiment of a process 400 for creation of a custom mobile web page. In this embodiment of the system, a server (for example, custom web page server 106 or CWDS 335) may automatically generate a tailored image of a mobile web page or of a subsection/portion of a mobile web page for viewing on a user's mobile device. Following the start 402 of process 400, at block 404 the process may receive information for a mobile device type. Mobile device type may include identifying data such as the manufacturer and model number of the mobile device. The mobile device type may be input or selected manually by the user. For example, a user may input the manufacturer as "Motorola" and the model as "V300" for a mobile phone. The mobile device type may also be obtained from the mobile device itself, or obtained through lookup in a database, table or other data storage (local or remote) in which a user identifier (e.g. user name, phone number, mobile ID number, customer number, or other identifier) is associated with the user's mobile device type.

The information received at block 404 for the mobile device type may include one or more specifications or parameters that may effect the display of and user interaction with web pages displayed on the mobile device, such as length and width of the display, screen resolution, color palette, navigation interfaces, and any other parameters (e.g., number of horizontal and vertical lines, number of pixels, color palette, or the like) for that particular model mobile device. Such information may be obtained through lookup in a database, table, or other data storage (local or remote) in which the mobile device type is associated with the information. Alternatively, the user may enter the information, such as the length and width of the display, which would then be used to estimate particular resolution of the mobile device's display.

Figure 5:
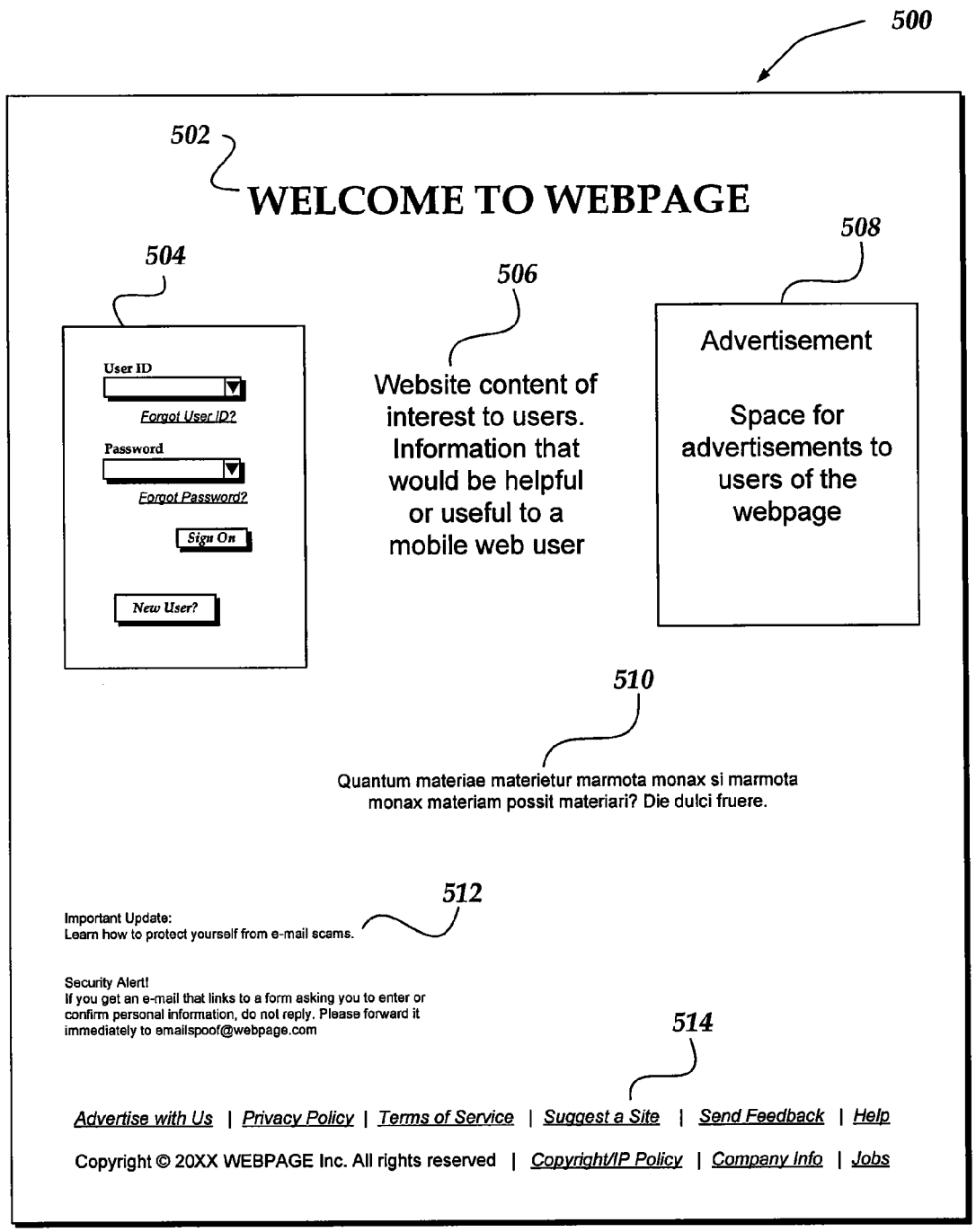
FIG. 5 shows an example of a web page as may be shown on a typical desktop monitor.

At block 406, the process may receive an indication of a selected page or portion of a page. Such indication may occur automatically when a user navigates or attempts to navigate to a page, either via a link from another page or by manually entering a URL. Such indication may also be made through other means, such as the receipt of a SMS, MMS or other message which identifies a web page. An example of a web page used to illustrate the invention is shown in FIG. 5. A web page may have title block 502, login section 504, content sections 506, 510 and 512, advertisements section 508, and hyperlinks 514. For many web pages, the location of the information does not change, even if the information itself does. As an example, for many websites, login section 504 always appears in the same location. These locations may change if there are major changes to the website, but such major changes do not occur with great frequency for most web sites.

At block 408, the process may tailor an image of the selected page based on the information for the mobile device type received at block 404. This tailoring may include first generating an image of the web page. The image may be in JPEG, GIF, BMP, or any other format for digital images. The process may then proceed to tailor the image to better fit the display parameters of the mobile device type. For example, the length and width of the image may be tailored to conform to the length and width of the mobile device display, the color palette of the image may be adjusted to fit that of the mobile device display, the resolution of the image may be adjusted to better conform to that of the mobile device display. The format of the image may also be changed, along with aspect ratio, size, color palette, or other characteristics.

Once the tailored image has been created, it may be served to the mobile device 410 and displayed to a user. The user who views the tailored image may be a user who navigated to the web page at block 406. Alternatively, the tailored image may be served to a mobile device of a different user. For example, a first user may wish to send a tailored image of the web page to a second user, such as a friend, co-worker, family member or other acquaintance. The tailored image may also be saved, in storage on a server or on the mobile device itself, and made available for future display.

The tailored image may also be added into a set of tailored images at block 412. The set may include images of web pages that are related (e.g., connected to each other by navigational links, hierarchically arranged such as in a parent/child relationship, sharing common subject matter, sharing a common domain). The set may also include images that are not related to each other. In at least some embodiments, a set may include images of web pages from a particular user's browsing session during a particular time period. Process 400 may return at block 414.

In at least some embodiments, a mobile web page selected for tailoring may include dynamic content that changes over time or that varies depending on the user, location, the device being used to view the web page, or other factors. In such cases, the tailored image created may include a static image of the dynamic content on the webpage (e.g., a snapshot of the dynamic webpage at a given time). The tailored image may also provide a link that a user may select to access the dynamic content of the mobile web page. For example, the web page may be a weather forecast page with content that is updated as the weather forecast changes throughout the day. The user may have access to a tailored image of the forecast page which was created that morning, and the tailored image may include a link that the user may select to access the dynamic web page and view current forecast information.

Figure 4B:
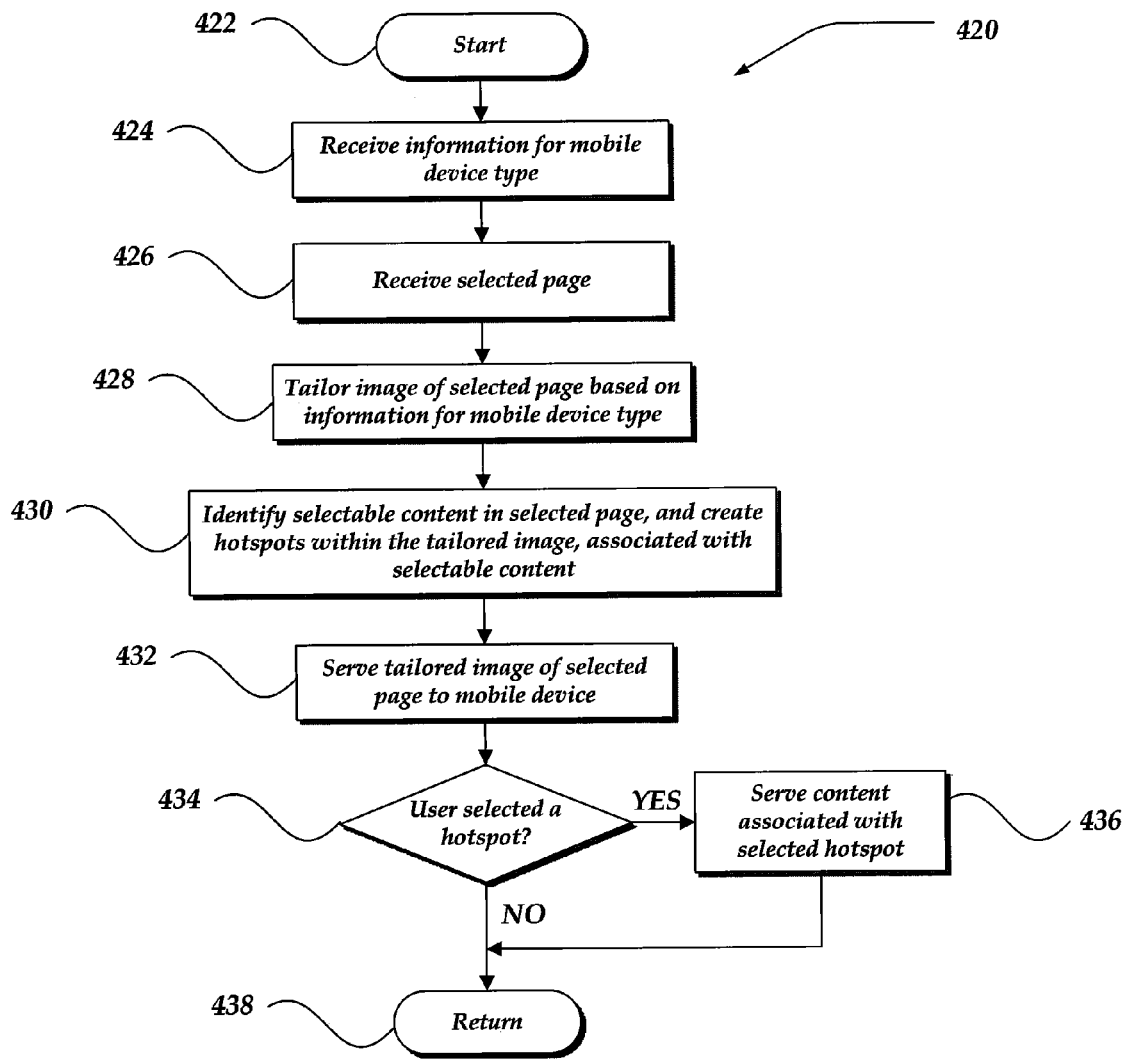
FIG. 4B shows a continued flow diagram for creation of one embodiment of the system in which a web page may be tailored to a mobile device.

FIG. 4B illustrates a logical flow diagram generally showing another embodiment of a process 420 for creation of a custom mobile web page. In this embodiment of the system, a server (e.g., custom web page server 106 or CWDS 335) may automatically generate a tailored image of a mobile web page for viewing on a user's mobile device, and the tailored image may also be created with one or more selectable (e.g., clickable) hotspots associated with dynamic content within the page.

After the start 422, process 420 may proceed similarly to process 400 illustrated in FIG. 4A. At block 424, information is received for a mobile device type. At block 426, the process receives indication of a selected page. At block 428, a tailored image of the selected page is created based on the received information for the mobile device type. Blocks 424, 426, and 428 may include similar functionality as blocks 404, 406 and 408 of FIG. 4A.

At block 430, the process may identify selectable content within the selected page, and may create hotspots within the tailored image associated with the selectable content. Selectable content may include dynamic content that is clickable or otherwise selectable by a user within a webpage, such as hyperlinks, controls (e.g. drop-down lists, text entry fields, click boxes, radio buttons, buttons), clickable or selectable images, or any other element of a web page which responds in some way to an action of the user. For at least some of the selectable content elements identified within the selected web page, hotspots may be added to the tailored image. The location and size of the hotspot within the tailored image may correlate with the position and size of the associated selectable content element within the web page. It may also be advantageous to alter the location or size of the hotspot if that would improve the usability of the tailored image.

The hotspot in the tailored image may provide similar functionality as the associated selectable content provided in the web page. For example, if a hyperlink in web page X allowed a user to navigate to a different web page Y, the hotspot in the tailored image of web page may X may allow the user to navigate to the same web page Y or to a tailored image of web page Y. Alternatively, the functionality of the hotspot may differ from that of the associated selectable content if the usability of the tailored image would be improved thereby.

At block 432, process 420 may serve the tailored image with hotspots to a user's mobile device. At block 434, the process may detect whether a user viewing the tailored image has selected or activated a hotspot within the tailored image. Selection may be via one or more of the input controls available on the mobile device, such as a keypad, touch screen, roll ball, button, stylus, or any other user input control. When the process detects that the user has selected a hotspot, it may then serve the selectable content associated with the selected hotspot if any clickable content is associated, or it may serve a target of the selectable content (e.g., if the selectable content was a hyperlink linking to another webpage, the process may serve the other webpage when the user selects the hotspot). The process may then continue to monitor the user's activities for additional hotspot selection, or may return 438.

Figure 4C:
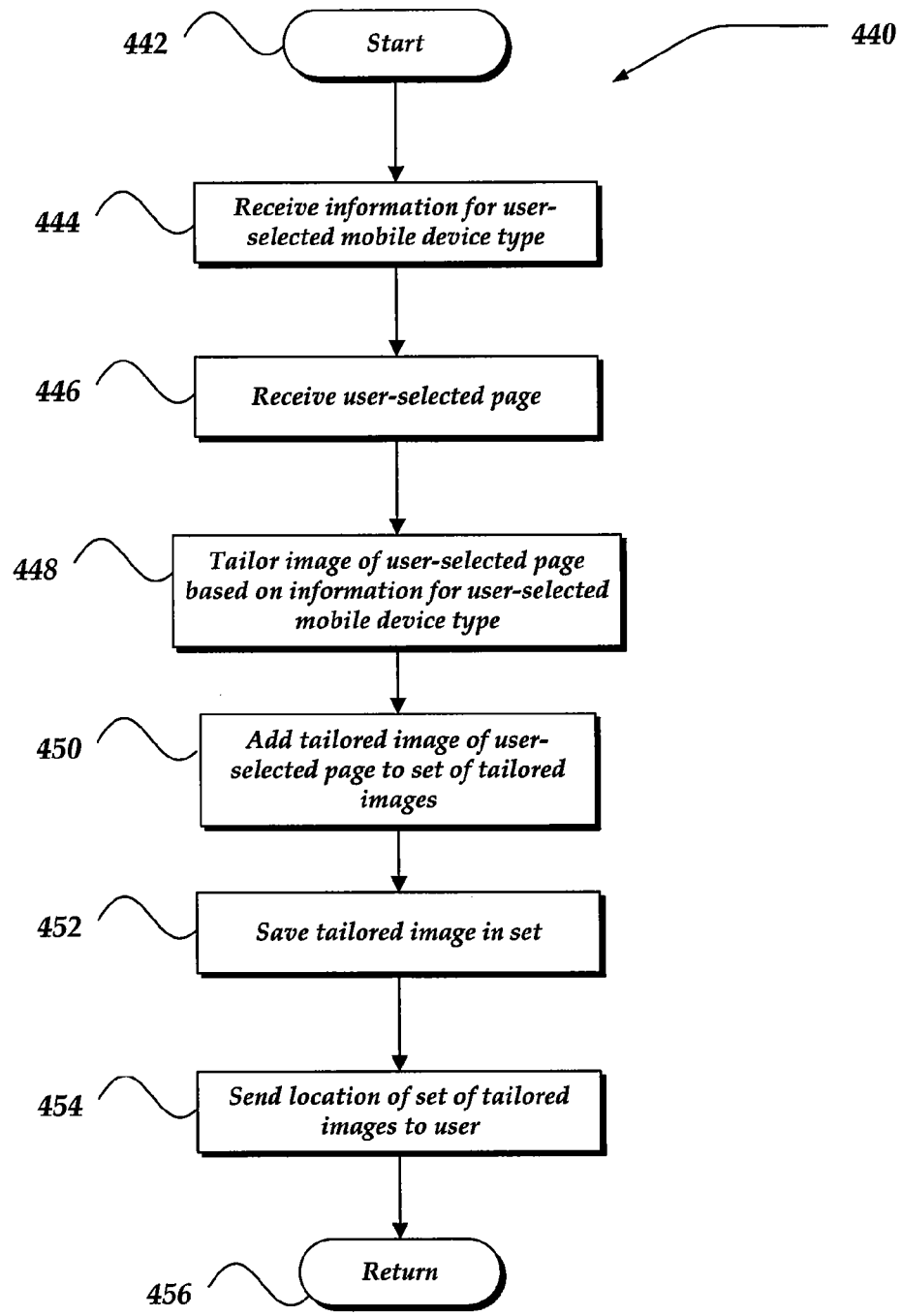
FIG. 4C shows a continued flow diagram for creation of one embodiment of the system in which a web page may be tailored to a mobile device.

FIG. 4C illustrates a logical flow diagram generally showing another embodiment of a process for creation of a custom mobile web page. In this embodiment of the system, a user may generate custom tailored images of mobile web pages at least in part manually, through the use of a tailoring application. Such a tailoring application may allow a user to specify a size (e.g. length and width, or other dimension), resolution, color palette of an image of a web site, for viewing on a mobile device. The tailoring application may also allow a user to select only a portion of a web site to generate the image. The tailoring application may be hosted by or otherwise made available to the user through a web site (e.g., a web portal such as Yahoo Portal) or remote server. Alternatively, the tailoring application may execute as a stand-alone application on the user's computing device.

Through use of the tailoring application, the user may generate a tailored image of a web page according to their preferences and the information (e.g. performance, capabilities, and parameters) for their mobile device type. As discussed herein, the information for the mobile device type may identify constraints for displaying and navigating web pages with the mobile device or the display requirements of the mobile device. Process 440 starts at block 442. At block 444, information for a user-selected mobile device type is received. In this embodiment, the user may identify their mobile device type to the tailoring application by providing at least some identifying information, such as the manufacturer and model number. As an example, a user may input the manufacturer as "Motorola" and the model as "V300" for a mobile phone. The mobile device type may also be obtained from the mobile device itself, or obtained through lookup in a database, table or other data storage (local or remote) in which a user identifier (e.g. user name, phone number, mobile ID number, customer number, or other identifier) is associated with the user's mobile device type.

Then, the tailoring application may lookup information related to the mobile device type, such as length and width of the display, screen resolution, color palette, navigation interfaces, and any other parameters that may effect the display and interaction with web pages displayed with the mobile device. This information may be available to the tailoring application through local or remote lookup tables, databases, or other data storage. Such data source may be accessed either locally or remotely to determine the resolution of the display (e.g., number of horizontal and vertical lines, number of pixels, color palette, or the like) for that particular model mobile device. The information may also have been saved by the tailoring application after a previous tailoring session, to memory on the user's computing device, to a cookie, or to a registry. This information may also be obtained by user input and/or selection. For example, the user may enter the length and width of the display, which would then be used to estimate particular resolution of the mobile device's display.

At block 446, the tailoring application may receive from the user an indication or identification of a web page to be tailored. The identification of a particular web page for customization can be accomplished by entering a URL, by using a browser to locate the web page or by any other method of identifying a web page. The tailoring application may then retrieve the web page identified by the user. An example of a web page used to illustrate the invention is shown in FIG. 5. A web page may have title block 502, login section 504, content sections 506, 510 and 512, advertisements section 508, and hyperlinks 514. For many web pages, the location of the information does not change, even if the information itself does. As an example, for many websites, login section 504 always appears in the same location. These locations may change if there are major changes to the website, but such major changes do not occur with great frequency for most web sites.

At block 448 of FIG. 4C, the user may give instructions to the tailoring application to tailor an image of the selected web page, based on information for the mobile device type and on the user's own preferences. In one embodiment, the tailoring application may first generate an image of the web page according to the information received for the mobile device type. The user may then select one or more subsections of the image to be served to their mobile device. In one embodiment, the image of the web page may be in a form of a user selectable JPEG wherein selections of the subsection may be made. The selectable format web page is then displayed to the user who may then select subsections of the web page. The tailoring application may then convert the subsection selection into, for example, a JPEG image formatted according to the user's subsection selection. The image may be presented to the user as it might appear on their mobile device. As an example, the tailoring application may generate an image of the mobile device for the user with the subsection selection presented within the "screen" of the image of the mobile device. In another embodiment, the system may determine the characteristics of the current display device used by user to tailor the mobile web page and generate the image according to the same parameters as might be seen on screen of the identified mobile device. In yet another embodiment, the system may simply present the selected subsection of the website in a separate window, and request confirmation that the subsection selection is acceptable. In yet another embodiment, the tailoring application or some other system may forward the selected subsection to the user's mobile, web-enabled device for confirmation. The user may then be asked whether they desire further subsection selections.

Figure 6:
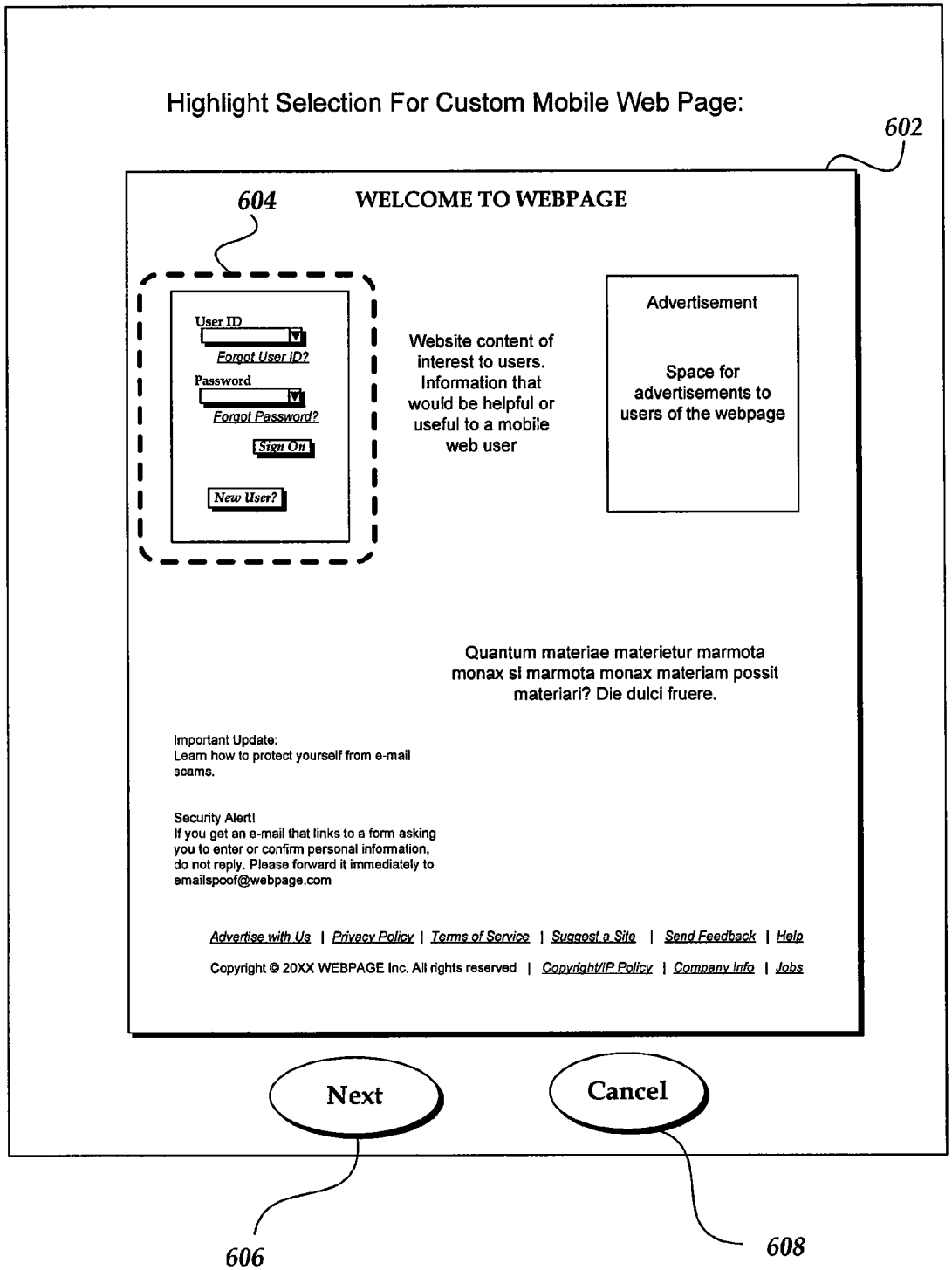
FIG. 6 illustrates an example of a user selecting a sub-section of a web page for use in the invention.

An example of a user selecting a subsection of a web page is shown in FIG. 6. The user is provided with image 602 of the web page in which the user may select a subsection of the web page as shown by subsection selection box 604. Subsection selection box 604 may have a length to width ratio that is determined by the specifications of the display of the user's mobile device. Thus, the user would be selecting a subsection that would be formatted to the user's mobile device. To complete the selection of the subsection, the user would press next button 606. An example of the subsection selection is shown FIG. 7, in which subsection selection 704 is displayed within the "display" of mobile device 702. The user would continue by pressing save button 706.

Additionally, as part of the operations at block 448, the user may be able to adjust other aspects of the web page image, such as resolution or color palette, to further tailor the image to the user's preferences. Moreover, the tailoring application may allow the user to select one or more elements of selectable content on the web page for which hotspots will be created. The tailoring application may allow the user to save the tailored image locally to the user's computing device to allow the user, for example, to resume tailoring the image at a later time.

On completion of the subsection selections and tailoring, the tailoring application may then display the entire tailored image of the web page for the user in a "clickable" form. This display may consist of an entire tailored image of the selected website in the form of a JPEG image, or other suitable image formats. The display may be formatted according to the specifications of the user's mobile device, that is, the length and width of the screen and may even include an approximation of the resolution of the display. In some embodiment, if the user scrolls over the image using a mouse, pointing device, electronic pen or the like (or if being viewed by the mobile device, even "tabbing" through the image), when the user selects any portion of the tailored image, the display may then show an enlarged or zoomed image of the selected portion. Because the image may be in the form of JPEG, which is a commonly used method of compression for photographic images, the degree of compression may be adjusted to allow a selectable tradeoff between storage size and image quality. JPEG typically achieves 10 to 1 compression with little perceivable loss in image quality. Other graphic file formats may be used, including but not limited to TIFF, RAW, PNG, GIF, BMP, CGM, SVG, Encapsulated PostScript, PDF, SWF, Windows Metafile and proprietary file formats.

Once tailoring is complete, the tailoring application may store the tailored image along with information relating to the custom tailored image of mobile web page. The tailored image may be stored on a server such as Custom Web Page Server 106, or in Data Store 352 of Network Device 300. The information stored may take many different forms. In one embodiment, storage may be under a path and filename that corresponds to the internet address of the website that was selected for tailoring, in essence a second URL associated with URL of the selected website. As an example, for a selected web page "http://www.aaabbbccc.com", the system (e.g., www.customwps.com) may create a path within its directory structure and save the information in a file, for example: "http://www.customwps.com\aabbcc.com\aaabbbccc_custom_web page.info".

The information that is stored may consist of the JPEG image of the web page, one or more JPEG images of subsection selections, information about the user's mobile device and information regarding the relation between the selected subsection selection and image of the web page. Further, the stored information may include information about hotspots associated with selectable content on the web page. The stored information may also include a time stamp showing date and time when the web page was received and tailored. Alternatively, the information may consist of the website URL, subsection selection criteria or information, and the specifications for the display. In one embodiment of the system, the JPEG image of the web page and subsection selections are re-created each time a user accesses the mobile web page. This permits the user to view an up-to-date image of the web page, and not a static image of the web page created during set up. The information may also be stored in such a manner that when other users access the mobile web page, the system will format the web page for the particular mobile device of the other users. Thus, users may share their customized mobile web pages with each other instead of having to individually set up each custom web page.

The tailored image may also be added to a set of other tailored images, at block 450. The set may include images of web pages that are related (e.g., connected to each other by navigational links, hierarchically arranged such as in a parent/child relationship, sharing common subject matter, sharing a common domain). The set may also include images that are not related to each other. A set may include images of web pages from a particular user's browsing session during a particular time period. The user may select a name for the set, or the set name may be generated automatically by the tailoring application or by the system generally. The set name may be based on the content of the tailored web page images saved in the set, or the URLs of the web pages that gave rise to the tailored images in the set. The set name may also be based on identifying information for the user, such as user name, mobile ID number, and the like. At block 452, the tailored image may be saved in the set, and the set may be saved to storage on a server such as Custom Web Page Server 106.

At block 454, the process may send to the user a location of the set of tailored images. The location may be sent to the user via an SMS, MMS, e-mail, or other type of message or notification. The set location may be in the form of a URL, so that the user might view the tailored images in the set by browsing to the URL. Alternatively, the process may send the user a URL for a location to a single tailored image, or multiple URLs giving locations of various tailored images. Process 440 may return at block 456.

In an embodiment, when a mobile web user seeks to access the custom tailored image of the web page, the user may select the domain, path and/or file name that was sent at block 454, by either entering it into their browser, bookmarking it or other methods of selecting a particular Internet location through a mobile device. Identification information may be required in order to access the tailored image. Identification information may be associated with the mobile, web-enabled device and may be transmitted with the request so that the user and/or the mobile device is identified and can be communicated with. Alternatively, the identification information may be transmitted during an initial connection or other appropriate time so as to identify the mobile, web-enabled device. The mobile device may use SMS or other types of communications to transmit the request for the tailored image. The system may then retrieve the user's mobile device information, either retrieving it from memory if entered during the setup process, or this may occur dynamically. For example, the user's mobile device information may be part of the request or other exchange of information between the user's mobile device and the system server. Alternatively, the information may be stored by the system in association with the mobile identification number or other identifier of the mobile, web-enabled device.

Next, the system would retrieve the web page associated with the custom web page and then process the web page to produce a clickable JPEG that includes the previous customization information. This page is then sent to the user's mobile device, and the user would then be able to view the custom web page on their mobile device. The user may select a subsection of the custom web page by tabbing, scrolling or otherwise selecting the subsection. If a subsection selection is selected by the user, the system would process the web page to produce a subsection of the page for display on the user's mobile device. In one embodiment of this device, each of the subsection selections can have further subsection selections.

Figure 7:
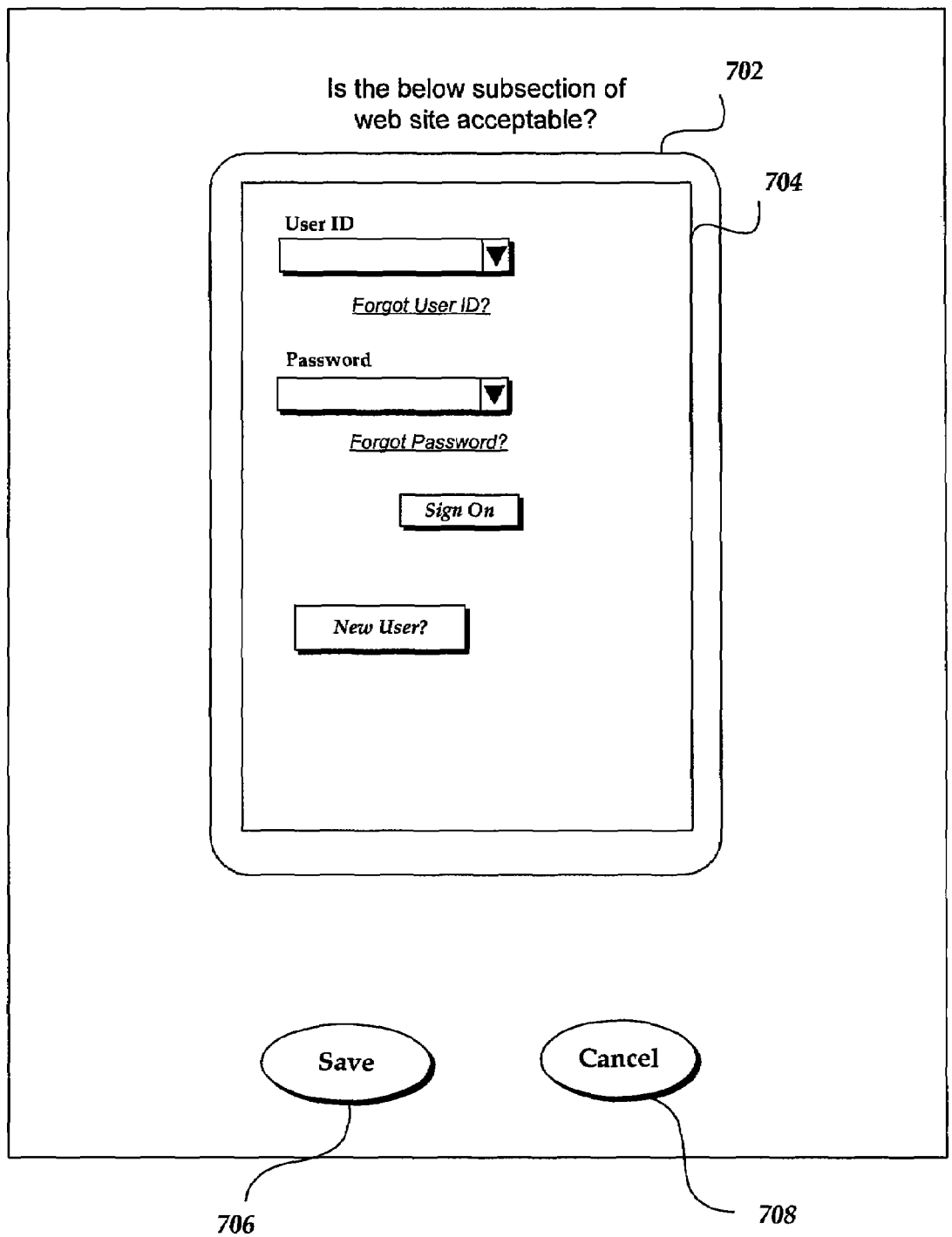
FIG. 7 illustrates an example of the sub-section of a web page as configured to be displayed on the user's mobile device.

The subsection selections may have entry boxes, selections, hyperlinks or the like. One example of entry boxes is shown in FIG. 7 wherein the website prompts for entry of a User ID and Password to sign into the website. In such an instance, the system may prompt for and receive the entry selections, forward them to the web page and receive the return web page information. After receipt, the system would then process the return image to produce a JPEG image for the user's mobile device and forward the web page to the user.

In one embodiment, a user viewing a tailored image of a webpage on a mobile device may have the capability of expanding or zooming a portion of the tailored image by selecting that portion. The user may select a portion to expand through one or more of the input controls available on the mobile device, such as a keypad, touch screen, roll ball, button, stylus, or any other user input control.

In at least some embodiments, the user who views the tailored image of the webpage or subsections of the webpage on a mobile device is a different user than the user who selected the web page and/or the one or more subsections of the web page to be tailored. More specifically, one user may select the content to be tailored and then may send to a second user the tailored content, a location of the tailored content, or the location of a set of tailored images of webpages or subsections of webpages. In this way, a user may share the tailored content with one or more friends, co-workers, family members or other acquaintances.

It will be understood that each block of the flowchart illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustrations may also be performed concurrently with other blocks or combinations of blocks, or even in a different sequence than illustrated without departing from the scope or spirit of the invention.

Accordingly, blocks of the flowchart illustrations support combinations of means for performing the specified actions, combinations of steps for performing the specified actions and program instruction means for performing the specified actions. It will also be understood that each block of the flowchart illustrations, and combinations of blocks in the flowchart illustrations, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected is:

1. A method for customizing content for display on a mobile device, comprising:
    providing a type of the mobile device, wherein the type is associated with at least one specification of the mobile device;
    indicating at least one portion of a selected page for display on the mobile device;
    tailoring an image of the at least one portion of the selected page based on the at least one specification of the mobile device;
    identifying at least one selectable element within the at least one portion of the selected page;
    creating in the tailored image at least one hotspot associated with at least one identified selectable element;
    providing the tailored image of the at least one portion of the selected page for display on the mobile device;
    providing an indication that the tailored image includes a static image of dynamic content; and
    providing a link that enables a user to access the dynamic content.

2. The method of claim 1, further comprising adding the tailored image of the at least one portion of the selected page to a set of one or more tailored images.

3. The method of claim 1, further comprising:
    adding the tailored image of the at least one portion of the selected page to a set of one or more tailored images;
    saving the set of one or more tailored images; and
    providing to the user a location of the saved set.

4. The method of claim 1, wherein the indication of the at least one portion of the selected page for display on the mobile device is provided by the user of the mobile device.

5. The method of claim 1, wherein the indication of the at least one portion of the selected page for display on the mobile device is provided by a first user, and wherein a second user is provided the tailored image of the at least one portion of the selected page.

6. The method of claim 1, wherein the indication of the at least one portion of the selected page for display on the mobile device is provided automatically.

7. The method of claim 1, wherein tailoring includes at least one of resizing, changing an aspect ratio, changing a format, or altering a color palette.

8. The method of claim 1, wherein tailoring is automatic.

9. A network device for customizing content for display on a mobile device, comprising:
- a transceiver operative to send and receive data over a network;
- a processor; and
- a processor-readable storage medium storing instructions that when executed on the processor enable actions, including:
  - providing a type of the mobile device, wherein the type is associated with at least one specification of the mobile device;
  - indicating at least one portion of a selected page for display on the mobile device;
  - tailoring an image of the at least one portion of the selected page based on the at least one specification of the mobile device;
  - identifying at least one selectable element within the at least one portion of the selected page;
  - creating in the tailored image at least one hotspot associated with at least one identified selectable element;
  - providing the tailored image of the at least one portion of the selected page for display on the mobile device;
  - providing an indication that the tailored image includes a static image of dynamic content; and
  - providing a link that enables a user to access the dynamic content.

10. The network device of claim 9, wherein the enabled actions further include adding the tailored image of the at least one portion of the selected page to a set of one or more tailored images.

11. A system for customizing content for display on a mobile device, comprising:
- a plurality of mobile devices in communication with a network;
- a server device in communication with a network and with the plurality of mobile devices, configured to perform actions including:
  - providing a type of at least one of the plurality of mobile devices, wherein the type is associated with at least one specification of the at least one mobile device;
  - indicating at least one portion of a selected page for display on the at least one mobile device;
  - tailoring an image of the at least one portion of the selected page based on the at least one specification of the at least one mobile device;
  - identifying at least one selectable element within the at least one portion of the selected page;
  - creating in the tailored image at least one hotspot associated with at least one identified selectable element;
  - providing the tailored image of the at least one portion of the selected page for display on the at least one mobile device;
  - providing an indication that the tailored image includes a static image of dynamic content; and
  - providing a link that enables a user to access the dynamic content.

12. A processor-readable storage medium storing instructions that when executed on a computing device enable actions for customizing content for display on a mobile device, including:
- providing a type of the mobile device, wherein the type is associated with at least one specification of the mobile device;
- indicating at least one portion of a selected page for display on the mobile device;
- tailoring an image of the at least one portion of the selected page based on the at least one specification of the mobile device;
- identifying at least one selectable element within the at least one portion of the selected page;
- creating in the tailored image at least one hotspot associated with at least one identified selectable element;
- providing the tailored image of the at least one portion of the selected page for display on the mobile device;
- providing an indication that the tailored image includes a static image of dynamic content; and
- providing a link that enables a user to access the dynamic content.

* * * * *

UNITED STATES PATENT AND TRADEMARK OFFICE
CERTIFICATE OF CORRECTION

PATENT NO.        : 7,627,648 B1                                         Page 1 of 1
APPLICATION NO.   : 12/508443
DATED             : December 1, 2009
INVENTOR(S)       : Satish Mehta et al.

It is certified that error appears in the above-identified patent and that said Letters Patent is hereby corrected as shown below:

In column 4, line 57, delete "(SMGL)," and insert -- (SGML), --, therefor.

In column 10, line 7, delete "(SMGL)," and insert -- (SGML), --, therefor.

Signed and Sealed this

Ninth Day of February, 2010

David J. Kappos
*Director of the United States Patent and Trademark Office*